United States Patent
Kamoshida

(10) Patent No.: US 9,003,915 B2
(45) Date of Patent: Apr. 14, 2015

(54) SHIFT DEVICE

(75) Inventor: Toru Kamoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 13/522,529

(22) PCT Filed: Jan. 18, 2011

(86) PCT No.: PCT/JP2011/050700
§ 371 (c)(1),
(2), (4) Date: Jul. 17, 2012

(87) PCT Pub. No.: WO2011/090011
PCT Pub. Date: Jul. 28, 2011

(65) Prior Publication Data
US 2012/0291579 A1 Nov. 22, 2012

(30) Foreign Application Priority Data
Jan. 19, 2010 (JP) .................................. 2010-009020

(51) Int. Cl.
| | |
|---|---|
| *B60K 20/00* | (2006.01) |
| *G05G 9/00* | (2006.01) |
| *F16H 59/04* | (2006.01) |
| *F16H 59/02* | (2006.01) |
| *F16H 59/10* | (2006.01) |
| *B60K 20/08* | (2006.01) |

(52) U.S. Cl.
CPC ............ *F16H 59/0204* (2013.01); *F16H 59/10* (2013.01); *B60K 20/08* (2013.01)

(58) Field of Classification Search
CPC ..... F16H 59/02; F16H 59/10; F16H 59/0204; F16H 59/08; F16H 61/22; F16H 61/24
USPC .................... 74/473.1, 473.18, 473.21, 473.3
See application file for complete search history.

(56) References Cited

U.S. PATENT DOCUMENTS

| | | | | |
|---|---|---|---|---|
| 7,137,475 | B2 * | 11/2006 | Shiomi et al. .................. 180/315 |
| 7,421,923 | B2 * | 9/2008 | Kim ............................ 74/473.12 |
| 7,552,659 | B2 * | 6/2009 | Komatsu et al. ................ 74/335 |
| 7,770,486 | B2 * | 8/2010 | Morita et al. ............... 74/473.18 |
| 2007/0137337 | A1 * | 6/2007 | Kim ................................ 74/335 |

(Continued)

FOREIGN PATENT DOCUMENTS

| | | |
|---|---|---|
| CN | 101318468 | 12/2008 |
| JP | 09-290657 | 11/1997 |

(Continued)

OTHER PUBLICATIONS

Chinese Office Action dated Jul. 18, 2014, Application No. 201180005257.0; partial English translation included.

*Primary Examiner* — William Kelleher
*Assistant Examiner* — Jake Cook
(74) *Attorney, Agent, or Firm* — Rankin, Hill & Clark LLP

(57) ABSTRACT

Regardless of the shift range of the 'current shift stage' while the shift lever is at the home position, the shift range is necessarily shifted to N range if the operator presses the first button. Thus, the operator can shift the shift range from N range to R range or D range (N→R, N→D) if, while maintaining the pressed state of the first button, the operator moves the shift lever from the home position, which is at the center of the three shift positions, to A position or B position corresponding to indication R or indication D.

5 Claims, 15 Drawing Sheets (c)

| | Current Stage | P | | R | | N | | D | | L | | P/R/N | D | L |
|---|---|---|---|---|---|---|---|---|---|---|---|---|---|---|
| Operation | First Button 16 | — | Press | — | Press | — | Press | — | Press | — | Press | — | — | — |
| | Second Button 18 | — | — | — | — | — | — | — | — | — | — | Press | Press | Press |
| | A(R) | x | R | x | (R) | x | R | x | R | x | R | x | x | x |
| | H | (P) | N | (R) | N | (N) | (N) | (D) | N | (L) | N | (P/R/N) | L | D |
| | B(D) | x | D | x | D | x | D | x | (D) | x | D | x | x | x |

(56) References Cited

U.S. PATENT DOCUMENTS

| | | | |
|---|---|---|---|
| 2008/0302196 A1* | 12/2008 | Komatsu et al. | 74/335 |
| 2012/0291579 A1* | 11/2012 | Kamoshida | 74/473.3 |

FOREIGN PATENT DOCUMENTS

| | | | |
|---|---|---|---|
| JP | 2001-004023 | 1/2001 | |
| JP | 2002-067725 | 3/2002 | |
| JP | 2002-254944 | 9/2002 | |
| JP | 2002-264684 | 9/2002 | |
| JP | 2002264684 A * | 9/2002 | B60K 23/00 |
| JP | 2002-310291 | 10/2002 | |
| JP | 2002310291 A * | 10/2002 | F16H 61/16 |
| JP | 2006-069368 | 3/2006 | |
| JP | 2007-30762 | 2/2007 | |
| JP | 2007-253912 | 10/2007 | |
| JP | 2007253912 A * | 10/2007 | |
| JP | 2008-155727 | 7/2008 | |
| JP | 2008-540239 | 11/2008 | |
| JP | 2008-302792 | 12/2008 | |
| JP | 2008-302816 | 12/2008 | |
| JP | 2009-101914 | 5/2009 | |
| WO | 2006-122785 | 11/2006 | |

* cited by examiner

| Current Stage | | P/R/N/D | P | N | P | N | R/D | D/L |
|---|---|---|---|---|---|---|---|---|
| Request | | Hold | N | R/D | R/D | R/D | N | L/D |
| Shift Lock | | — | BRK | — | BRK | BRK | — | — |
| Operation | A(R) | × | — | push+R | push+R | (push(N)) | — | × |
| | H | H | push | (push(N)) | (push(N)) | — | push | Press Second Button(H) |
| | B(D) | × | — | push+D | push+D | push+D | — | × |

(c)

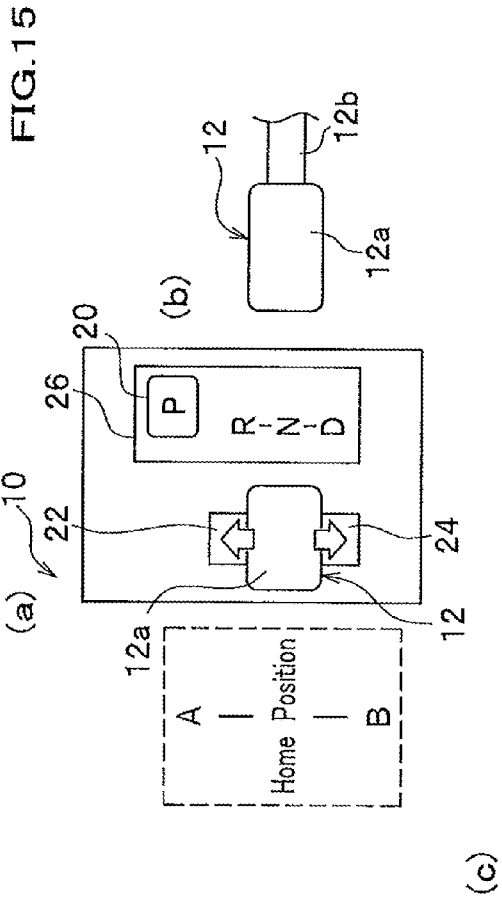

ns.
SHIFT DEVICE

TECHNICAL FILED

The present invention relates to a shift device by a shift by wire (SBW) system, which electrically shifts the connection status of a transmission, based on a selection of a range of the transmission.

BACKGROUND ART

Shift devices by a shift by wire system are conventionally known. Such a shift device, for example, electrically operates an actuator, based on operation of a shift lever with a joystick system by a driver, and shifts the connection status of an automatic transmission by the actuator.

As a shift device of this kind, for example, Patent Document 1 discloses a shift device that has a home position, to which a shift lever automatically returns, and enables selection of the respective ranges of an automatic transmission by continuously operating the shift lever from the home position in plural directions.

BACKGROUND ART DOCUMENT

Patent Document

Patent Document 1: Japanese Patent Application Laid-Open No. 2008-302792

DISCLOSURE OF THE INVENTION

Problems to be Solved by the Invention

The shift device disclosed by Patent Document 1 is configured such that the respective ranges of the automatic transmission are selected at corresponding different positions, and the movement range of the shift lever is accordingly wide, which possibly makes the size of the whole shift device large.

The shift device disclosed by Patent Document 1 is provided with a number of positions, as shift positions, including a home position X, a neutral position N, a reverse position R, and a drive position D. Corresponding to the respective positions, this shift device requires a number of sensor elements (for example, magnetic Hall element) and gates for detecting that the shift lever has surely moved to a predetermined shift position, and thus possibly causes a high manufacturing cost.

The present invention has been developed addressing this point, and an object of the invention is to provide a shift device, wherein the whole device is down sized by narrowing the movable range of a range selection mechanism, and the manufacturing cost of the device can be reduced with a simple structure for detecting the position of the range selection mechanism.

Means for Solving the Problems

To achieve the above-described aims, the present invention provides a shift device, comprising:
a range selection mechanism for selecting an N range and one or more ranges other than the N range of a transmission;
a home position to which the range selection mechanism automatically returns after an operation of the range selection mechanism; and
other positions to which the range selection mechanism is moved in predetermined directions from the home position, characterized in that, for the transmission, in a state that at least one range has been selected from the other ranges and the range selection mechanism is at the home position, the N range is always selected by performing a first predetermined operation of the range selection mechanism, and wherein, in a state that the N range has been selected and the range selection mechanism is at the home position, a range other than the N range is selected from the other ranges by performing a second predetermined operation of the range selection mechanism.

According to the present invention, irrespective of which range (a range other than the N range) the range selection mechanism at the home position is in, the N range is always selected by performing the first predetermined operation of the range selection mechanism, and after the selection of N range, a desired range other than N range can be selected by performing the second predetermined operation. It is thus unnecessary to provide a position (moving gate) dedicated N range. As a result, according to the invention, it is possible to make the movement range of the range selection mechanism small, and reduce the manufacturing cost with a simple structure for detecting the position of the range selection mechanism.

In addition, the present invention is characterized in that the first predetermined operation is to operate a button, that the first predetermined operation is to push the range selection mechanism along an axial direction, or that the predetermined operation is to move the position of the range selection mechanism from the home position to the other positions.

According to the invention, by making the first predetermined operation be an operation to operate a button, transition to the second predetermined operation can be performed with a feeling similar to a feeling in operating the shift selection mechanism in a state that a shift lock release button, which is generally used for a vehicle, has been operated, and the operator can perform operation without a feeling of strangeness. Further, according to the invention, by making the first predetermined operation be an operation to push the range selection mechanism along the axial direction or move the range selection mechanism from the home position to another position, it is unnecessary to provide a mechanism, for example, a push button, and thus attain downsizing of a portion of the range selection mechanism, the portion being gripped by the operator.

In addition, the present invention is characterized in that the second predetermined operation is to move the range selection mechanism from the home position to one of the other positions.

According to the invention, by making the second predetermined operation be an operation to move the range selection mechanism from the home position to another position, it is unnecessary to provide a mechanism, for example, a push button, and it is thus possible to select a range other than N range with a minimum operation range (movement range) of the range selection mechanism.

In addition, the present invention is characterized in that one of the other ranges is D range, and that when the second predetermined operation is performed in a state that the D range has been selected, the transmission turns into a manual mode in which a gear stage of the transmission changes by one stage each time the second predetermined operations is performed.

According to the invention, by performing the second predetermined operation in a state the D range is selected, the normal automatic driving mode can be switched to the manual mode. Accordingly, it is unnecessary to provide a device dedicated to selection of the manual mode. As a result, it is possible to add a mechanism for selection of the manual mode without making the size of the shift device large.

In addition, the present invention is characterized in that for the transmission, even in case that the second predetermined operation is performed, the range selection mechanism automatically returns to the home position, and thereafter the first predetermined operation is performed, if the first predetermined operation is performed within a predetermined time after the automatic return of the range selection mechanism, the range selection of the N range is determined invalid.

According to the invention, even if the first predetermined operation is performed in a predetermined time after the shift range selection mechanism returns to the home position by the second predetermined operation, as range selection of N range is determined invalid, it is thereby possible to prevent erroneous operation after the second predetermined operation is performed.

Moreover, in the present invention, a shift device, comprises:

a range selection mechanism for selecting an N range and one or more ranges other than the N range of a transmission;

a home position to which the range selection mechanism automatically returns after an operation of the range selection mechanism; and other positions to which the range selection mechanism is moved in predetermined directions from the home position, wherein, for the transmission, in a state that at least one range has been selected from the other ranges and the range selection mechanism is at the home position, the N range is always selected by moving the range selection mechanism to one of the other position/positions, and wherein, a range other than the N range is selected from the other ranges by holding the range selection mechanism at the one of the other positions for a predetermined time after the N range is selected at the one of the other positions.

According to the invention, regardless in which range (a range other than N range) the range selection mechanism is at the home position, N range is always selected by moving the range selection mechanism to another position, and a desired range other than N range can be selected by holding the range selection mechanism at the other position for a predetermined time after the selection of N range. Accordingly, it is unnecessary to provide a position (movement gate) dedicated to N range. As a result, according to the invention, it is possible to make the movement range of the range selection mechanism small and reduce the manufacturing cost by simplifying the structure for detecting the position of the range selection mechanism. Further, according to the invention, it is possible to select a range other than N range without adding a special device.

Moreover, in the present invention, a shift device, comprising:

a range selection mechanism for selecting an N range and one or more ranges other than the N range of a transmission;

a home position to which the range selection mechanism automatically returns after an operation of the range selection mechanism; and other positions to which the range selection mechanism is moved in predetermined directions from the home position, characterized in that, for the transmission, in a state that a non-driving range has been selected by the range selection mechanism and the range selection mechanism is at the home position, one of the other ranges other than the N range is selected by performing a third predetermined operation of the range selection mechanism.

According to the invention, in a state that a non-driving range (N range or P range) has been selected by the range selection mechanism and the range selection mechanism is at the home position, a range (for example, D range or R range) other than N range can be easily selected by performing the third predetermined operation of the range selection mechanism (for example, operation to move the range selection mechanism from the home position to another position) without N range being selected. As a result, according to the invention, it is unnecessary to provide a special device for shifting the range position from a non-driving range (N range or P range) to a range (for example, D range or R range) other than N range not through N range, and downsizing and weight reducing of the device can be thus attained.

In addition, the present invention is characterized in that one of the other range/ranges is R range or D range, and that, for the transmission, in a state that P range has been selected as the non-driving range, the R range or the D range is selected when the range selection mechanism is moved to one of the other positions.

According to the invention, in case that P range has been selected, it is possible to easily select another range, namely R range or D range, by just moving the range selection mechanism to another position without selecting N range. The operability, for example at a start of driving from a parking state, can be thus improved.

Moreover, in the present invention, a shift device, comprising:

a range selection mechanism for selecting N range and one or more ranges other than the N range of a transmission;

a home position to which the range selection mechanism automatically returns after an operation of the range selection mechanism; and other positions to which the range selection mechanism is moved in predetermined directions from the home position, wherein, for the transmission, in a state that a driving range has been selected by the range selection mechanism and the range selection mechanism is at the home position, the N range or another driving range is selected by performing a fourth predetermined operation of the range selection mechanism, the other driving range being in the same direction as a driving direction of the driving range having been selected and at a gear stage different from a gear stage of the driving range having been selected.

According to the invention, in a state that a driving range (D range, L range, or R range) has been selected by the range selection mechanism and the range selection mechanism is at the home position, by performing a fourth predetermined operation of the range selection mechanism (for example, moving operation to move the range selection mechanism from the home position to another position), selected is N range or a driving range (L range) that is in the same direction as the driving direction of the current driving range having been selected and is different in the gear stage from the current driving range having been selected. As a result, according to the invention, it is possible to easily shift the range from the current driving range to a driving range in the same direction as the current driving range and with a gear stage different from the gear stage of the current driving range, and also this shifting to the driving range in the same direction as the current driving range and with the gear stage different from the gear stage of the current driving range can be attained without a special device for this shifting.

Advantageous Effect of the Invention

According to the invention, it is possible to provide a shift device, wherein the whole device is downsized by narrowing the movable range of a range selection mechanism, and the manufacturing cost can be reduced with a simple structure for detecting the position of the range selection mechanism.

BRIEF DESCRIPTION OF THE DRAWINGS

FIG. 15(a) is a plan view of a shift device according to a fourth modified example in the third embodiment of the invention; FIG. 15(b) is a partial side view of a shift lever of the shift device; FIG. 15(c) is an illustration showing shift patterns of range shifting by operation of the shift device.

EMBODIMENTS FOR CARRYING OUT THE INVENTION

Figure 1:
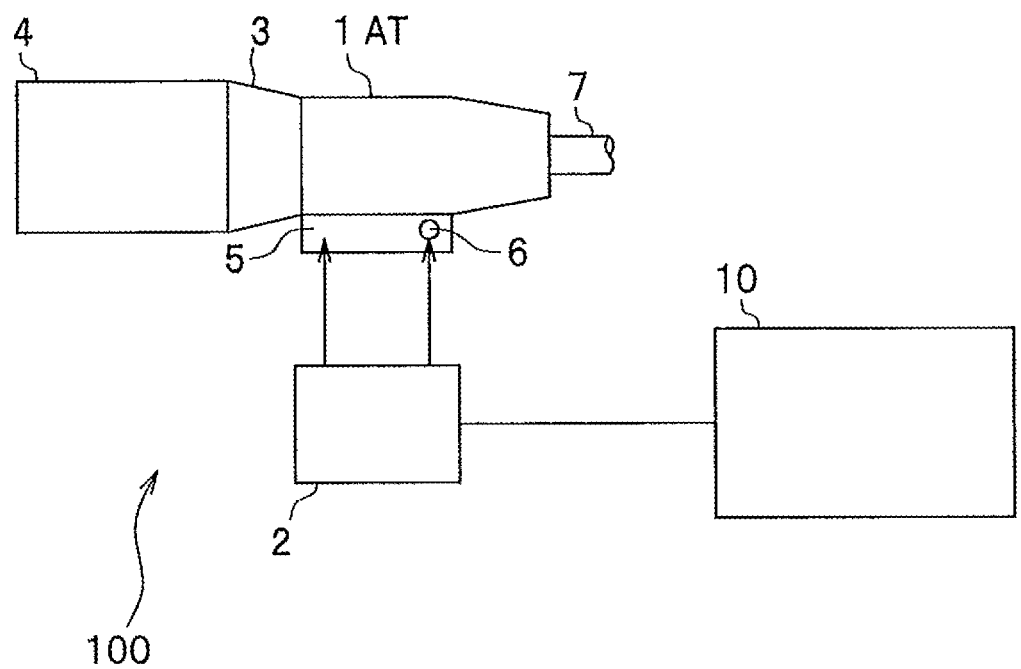
FIG. 1 is a block diagram of a shift operation system in which a shift device according to a first embodiment of the invention is incorporated.
Figure 2:
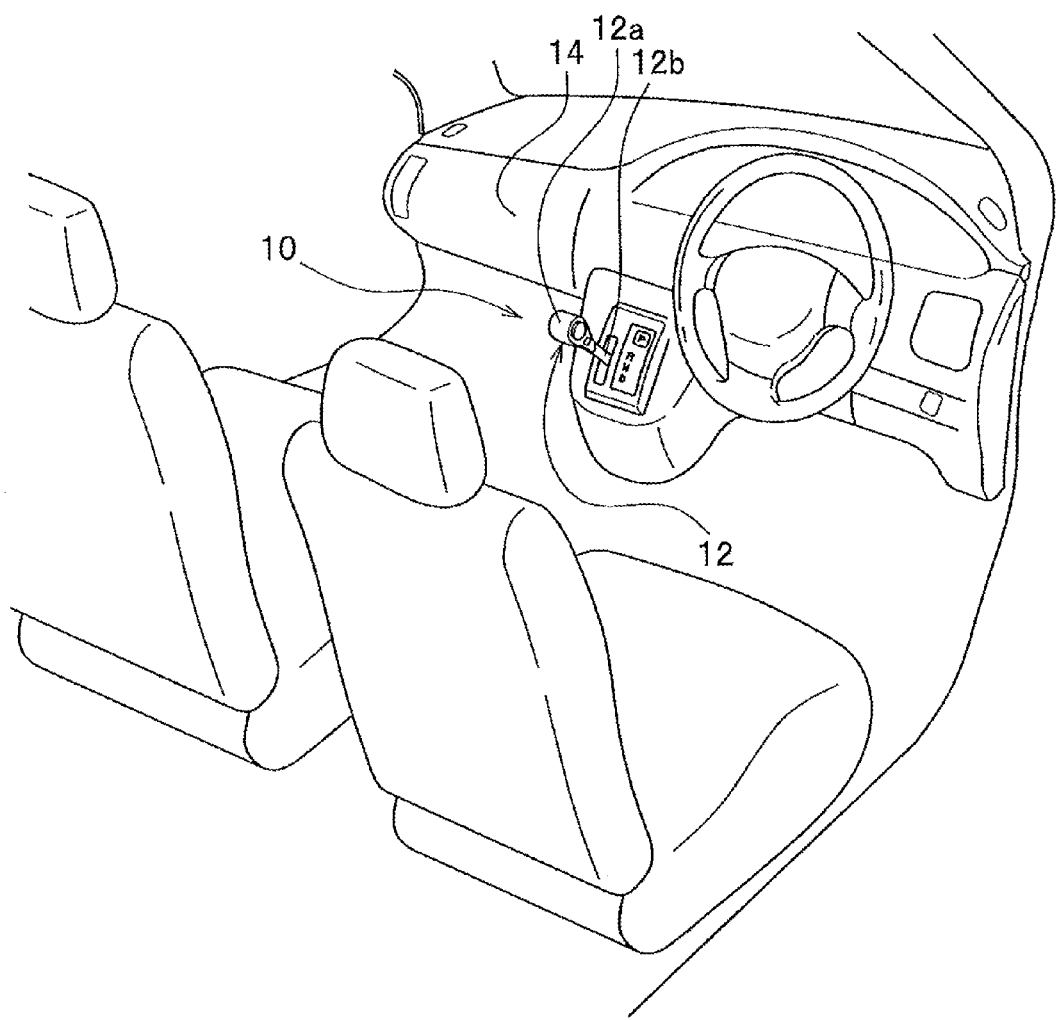
FIG. 2 is a perspective view of the front side of the cabin interior of a vehicle in which the shift device shown in FIG. 1 is incorporated.

Embodiments of the present invention will be described below in detail, referring to the drawings, as appropriate. FIG. 1 is a block diagram of a shift operation system in which a shift device according to a first embodiment of the invention is incorporated. FIG. 2 is a perspective view of the front side of the cabin interior of a vehicle in which the shift device shown in FIG. 1 is incorporated.

<Shift Operation System>

In a shift operation system 100 shown in FIG. 1, an automatic transmission (transmission) 1 (hereinafter, referred to as AT1) is electrically connected with a controller 2 and a shift device 10. AT1 is connected through a torque convertor 3 to the engine output shaft (not shown) of an engine 4. A hydraulic control section 5 of AT1 is provided with an electrical actuator 6 for range shifting of AT1. Herein, the hydraulic control section 5 and the electrical actuator 6 are subjected to drive control, based on a control signal that is output from the controller 2.

First Embodiment

The shift device 10 according to the first embodiment of the invention is provided on the front side of the cabin interior, and is electrically connected with the controller 2 by a shift by wire system (SBW system). Herein, a detection signal corresponding to the operation status of the shift device 10 is introduced to the controller 2, and the controller 2 controls the hydraulic control section 5 and the electrical actuator 6, based on the detection signal introduced from the shift device 10.

The shift ranges of AT1 includes P range (parking range), R range (reverse range), N range (a neutral range), D range (drive range), and L range (low range) (refer to FIG. 3(c)). Herein, when N range is selected, power transmission between the engine 4 side of AT1 and the drive wheel side (not shown) is set such as to be in a cutoff state. When P range is selected by pressing the later-described third button 20 (refer to FIG. 3(a)), a parking lock mechanism, not shown, operates to mechanically lock the output shaft 7 of AT1.

FIG. 3(a) is a plan view of the shift device according to the first embodiment of the invention. FIG. 3(b) is a partial side view of a shift lever of the shift device.

The shift device 10 in the first embodiment is provided with a shift lever 12 operated by a driver, and the shift lever 12 includes a shift rod 12b, and a shift knob 12a that is connected with the tip end portion of the shift rod 12b and can be gripped by a driver by hand. Herein, the shift lever 12 functions as a range selection mechanism. This range selection mechanism is not limited to a lever system for example with the shift lever 12, and may be for example arranged by a dial system for range shifting by rotating a dial, not shown, in predetermined directions or by a button system for range shifting by operation of a button, not shown.

In the first embodiment, a so-called instrument panel shift for which the shift lever 12 is arranged on an instrument panel 14 is shown as an example (refer to FIG. 2), however, without being limited thereto, for example, a floor shift for which the shift lever 12 is arranged on the floor or a column shift for which the shift lever 12 is arranged on a steering column may be applied.

Figure 3:
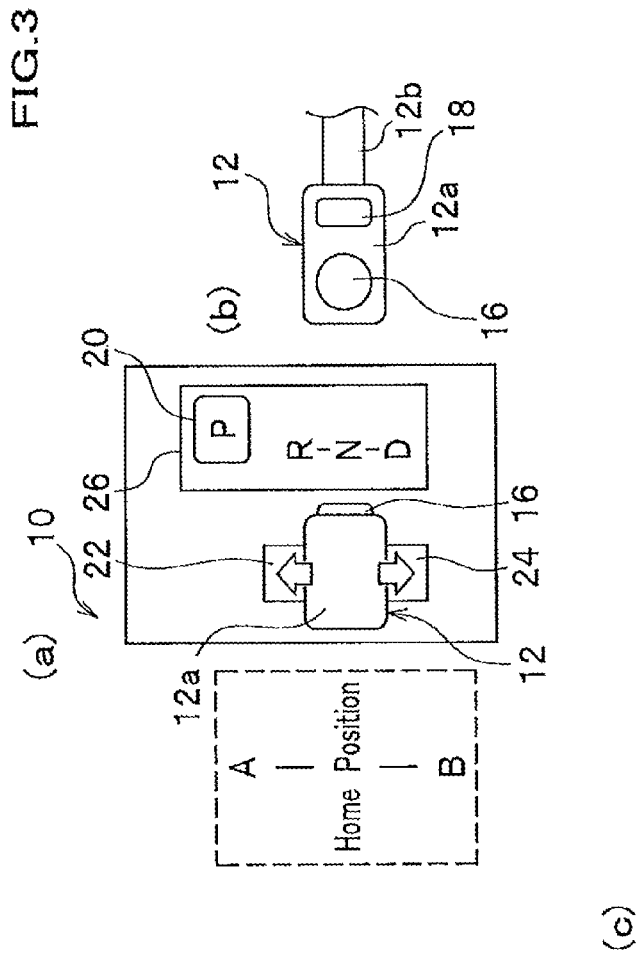
FIG. 3(a) is a plan view of the shift device according to the first embodiment of the invention.
FIG. 3(b) is a partial side view of a shift lever of the shift device.
FIG. 3(c) is an illustration showing shift patterns of range shifting by operation of the shift device.

On one side face of the shift knob 12*a*, the side face being substantially perpendicular to the moving direction of the shift knob 12*a*, as shown in FIG. 3(*b*), there are provided a first button 16 that releases a locked state of the shift lever 12 and selects N range by being pressed, and a second button 18 that selects L range or D range and releases selected L range or D range by being pressed.

The first button 16 and the second button 18 are arranged, for example, as a switch that turns from OFF state to ON state by being pressed and turns from ON state to OFF state by being released from the pressed state when the driver releases a hand from the button, or as a switch that is locked into ON state by being once pressed and is released, by being again pressed, from locking that is the above-described ON state.

Three shift positions of the shift lever 12 are arranged with a predetermined distance therebetween substantially on a line, that are a home position (described as 'HOME POSITION' in the figure) disposed at the center, A position (another position) disposed upper than the home position through a first path 22, and B position (still another position) disposed lower than the home position through a second path 24. The three positions, that are these shift positions, are conveniently shown in a dashed rectangular box on the left side of FIG. 3(*a*), which is similar in the subsequent embodiments and the modified examples.

In this case, the shift lever 12 is normally kept at the home position. If an operator moves the shift lever 12 upward or downward, thereby selects a shift position of A position or B position, and thereafter releases hand from the shift lever 12, then the shift lever 12 automatically returns to the home position through a lever return mechanism (not shown).

The first embodiment is different from conventional arts in that a position (shift position) dedicated to 'N range' in conventional arts is not provided. This point will be described later in detail.

On a table plate 26 adjacent to the first path 22 and the second path 24 where the shift lever 12 can linearly move, there are provided an indicator 'N' in an English character disposed at the center, an indicator 'R' in an English character disposed upper than the indicator 'N', an indicator 'D' in an English character disposed lower than the indicator 'N'. The upper/lower disposition (the upper/lower order) of 'R-N-D' for which 'R' is disposed upper and 'D' is disposed lower with 'N' at the center is similar to that of a shift device conventionally used.

Further, a third button 20 for selecting P by being pressed is provided at the upper portion of the table plate 26. Similarly to the first button 16 and the second button 18, the third button 20 is arranged as a switch for turning from OFF state to ON state by being pressed.

When one of the first to third buttons 16, 18, and 20 has turned from OFF state to ON state by being pressed, an ON signal corresponding to the pressed button is introduced to the controller 2, then the controller 2 recognizes that the one of the first to third buttons 16, 18, and 20 has turned to ON state, and the controller 2 thereafter performs control by transmitting a predetermined control signal to an object of control.

Accordingly, as will be described later, even in case that, without the first button 16 being pressed, for example, the shift lever 12 has moved from the home position to another position by erroneous operation by hand hitting, as the controller 2 has not received an ON signal from the first button 16, the controller 2 determines that this shift switching is invalid and does not transmit any control signal to an object of control. In this case, this range shifting operation by the shift lever 12 is invalid and the current from before is held as the current range.

In the respective ranges of P range, R range, N range, D range, and L range, the shift lever 12 is held in a locked state by a shift lock mechanism configured, for example, with a solenoid, not shown. In this locked state of the shift lever 12, as the shift lever 12 cannot be moved to another position while the shift lever 12 is held at a certain position, erroneous operation, for example, by hand hitting by the operator, can be prevented.

In this case, the locked state of the shift lever 12 can be released by pressing the first button 16, and this release of the locked state allows it to move the shift lever 12 from the home position to A position or B position. Instead of a mechanical structure such as a solenoid, the locked state of the shift lever 12 may be released, for example, based on a program (sequence control), not shown, provided on the controller 2.

When the shift lever 12 is moved to A position upper than the home position or B position lower than the home position, a contact member, not shown, mechanically comes in contact with the shift lever 12 so that the shift lever 12 reaches a certain hit-stop position. Accordingly, it does not occur that the operator is unable to recognize a shift position, which improves the operational stability of the shift lever 12 by the operator.

The shift operation system 100 with the incorporated shift device 10 according to the first embodiment is configured basically as described above, and the operational advantages of the shift operation system 100 will be described below.

FIG. 3(*c*) is an illustration showing shift patterns of range shifting by operation of the shift device according to the first embodiment. In FIG. 3(*c*), 'current shift stage' in the horizontal top row indicates in which range the shift lever 12 in the current shift stage is, while 'operation' in the vertical column indicates by which operation by the operator the current shift stage has moved to a next range. Regarding the first button 16 and the second button 18, each 'press' represents an example of button operation, and '-' represents not operating a button.

In the first embodiment, the shift lever 12 is locked by the shift lock mechanism, not shown, in the locked state at a certain shift position, and held in a static state at the home position (H position), being unable to move. In this situation, when the operator intends to move the shift lever 12 to a desired shift position, the operator moves the shift lever 12 from the home position to the upper A position or the lower B position while pressing the first button 16.

For example, when the 'current shift stage' is in P range, range shifting will be performed as follows by the operator. The locked state of the shift lever 12 is released and the shift range is shifted to N range (P→N) if the operator presses the first button 16, and further, the shift range of AT1 is shifted to R range (N→R) if the operator moves the shift lever 12 from the home position to the upper A position along the first path 22 while pressing the first button 16 by 'operation', or the shift range of AT1 is shifted to D range (N→D) if the operator moves the shift lever 12 from the home position to the lower B position along the second path 24 while pressing the first button 16 by 'operation'. Arrangement is made such that in case that the first button 16 is not pressed, range shifting to N range is not performed and the shift range is held at P range, which is the 'current shift stage', and the shift lever 12 cannot be moved from the home position to A position or B position because the shift lever 12 is held in the locked state by the shift lock mechanism, not shown.

For example, when the 'current shift stage' is in R range, range shifting will be performed as follows by the operator. The shift range is shifted to N range (R→N) if the operator presses the first button 16, and further, the shift range remains held at R range if the operator moves the shift lever 12 from the home position to the upper A position along the first path 22 while pressing the first button 16 by 'operation', or the shift range of AT1 is shifted to D range (N→D) if the operator moves the shift lever 12 from the home position to the lower B position along the second path 24 while pressing the first button 16 by 'operation'. Arrangement is made such that in case that the first button 16 is not pressed, range shifting to N range is not performed and the shift range is held at R range, which is the 'current shift stage', and the shift lever 12 cannot be moved from the home position to A position or B position because the shift lever 12 is held in the locked state by the shift lock mechanism, not shown.

For example, when the 'current shift stage' is in N range, range shifting will be performed as follows by the operator. The shift range remains held at N range if the operator presses the first button 16, and further, the shift range of AT1 is shifted to R range (N→R) if the operator moves the shift lever 12 from the home position to the upper A position along the first path 22 while pressing the first button 16 by 'operation', or the shift range of AT1 is shifted to D range (N→D) if the operator moves the shift lever 12 from the home position to the lower B position along the second path 24 while pressing the first button 16 by 'operation'. Arrangement is made such that in case that the first button 16 is not pressed, the shift range is held at N range, which is the 'current shift stage', without range shifting to N range, and the shift lever 12 cannot be moved from the home position to A position or B position because the shift lever 12 is held in the locked state by the shift lock mechanism, not shown.

For example, when the 'current shift stage' is in D range, range shifting will be performed as follows by the operator. The shift range is shifted to N range (D→N) if the operator presses the first button 16, and further, the shift range of AT1 is shifted to R range (N→R) if the operator moves the shift lever 12 from the home position to the upper A position along the first path 22 while pressing the first button 16 by 'operation', or the shift range of AT1 remains held at D range if the operator moves the shift lever 12 from the home position to the lower B position along the second path 24 while pressing the first button 16 by 'operation'. Arrangement is made such that in case that the first button 16 is not pressed, range shifting to N range is not performed and the shift range is held at D range, which is the 'current shift stage', and the shift lever 12 cannot be moved from the home position to A position or B position because the shift lever 12 is held in the locked state by the shift lock mechanism, not shown.

For example, when the 'current shift stage' is in L range, range shifting will be performed as follows by the operator. The shift range is shifted to N range (L→N) if the operator presses the first button 16, and further, the shift range of AT1 is shifted to R range (N→R) if the operator moves the shift lever 12 from the home position to the upper A position along the first path 22 while pressing the first button 16 by 'operation', or the shift range of AT1 is shifted to D range (N→D) if the operator moves the shift lever 12 from the home position to the lower B position along the second path 24 while pressing the first button 16 by 'operation'. Arrangement is made such that in case that the first button 16 is not pressed, range shifting to N range is not performed and the shift range is held at L range, which is the 'current shift stage', and the shift lever 12 cannot be moved from the home position to A position or B position because the shift lever 12 is held in the locked state by the shift lock mechanism, not shown.

In any one of the above-described operation patterns, after the shift lever 12 moves from the home position to A position or B position, the shift lever 12 automatically returns to the home position if the operator releases hand from the shift lever 12. Accordingly, in a state of R range or D range, the shift lever 12 is held in a static state at the home position.

A case that the second button 18 is pressed by 'operation' will be described below.

When the 'current shift stage' is in any one of P range/R range/N range, the shift range remains held at the range in the 'current shift stage' even if the operator presses the second button 18, and the shift lever 12 cannot be moved from the home position to A position or B position because the locked state of the shift lever 12 is not released (because the first button 16 is not pressed).

When the 'current shift stage' is in D range, the shift range of AT1 is shifted to L range if the operator presses the second button 18. In reverse, when the 'current shift stage' is in L range, the shift range of AT1 is shifted to D range if the operator presses the second button 18.

In the first embodiment, for example, when the 'current shift stage' is in N range at the home position, R range is selected (N→R) if the operator moves the shift lever 12 from the home position to A position (indicated as R) while pressing the first button 16, and if the operator subsequently presses the first button 16 after the shift lever 12 automatically returns to the home position, the shift range can be shifted to N range (R→N), while the shift lever 12 remains held at the home position.

In the first embodiment, regardless of the shift range of the 'current shift stage' while the shift lever 12 is at the home position, the shift range is necessarily shifted to N range if the operator presses the first button 16. Thus, the operator can shift the shift range from N range to R range or D range (N→R, N→D) if, while maintaining the pressed state of the first button 16, the operator moves the shift lever 12 from the home position, which is at the center of the three shift positions, to A position or B position corresponding to indication R or indication D.

In such a manner, in the first embodiment, the meaning of A position or B position is set such as to correspond with indicator 'R' or 'D' in an English character on the table plate 26 so that an operator can perform operation with a view similar to a view in shift lever operation of a conventional automatic transmission, and can thereby perform stable shift operation without a feeling of strangeness.

Further, in the first embodiment, the shift lever 12 is held in the locked state at the home position by the shift lock mechanism, not shown, and the shift lever 12 cannot be moved unless the locked state is released by pressing the first button 16. Consequently, the shift operation is easy to understand and it is possible to attain an excellent shift operation feeling.

In the first embodiment, a first predetermined operation is to press the first button 16, and a second predetermined operation is to move the shift lever 12 from the home position to A position or B position while pressing the first button 16.

Thus, in the first embodiment, regardless of which range the range selection mechanism (shift lever 12) at the home position is in regarding the 'current shift stage', N range is always selected by performing the first predetermined operation (pressing the first button 16) of the range selection mechanism (shift lever 12), and a desired range (D range, R range) other than N range can be selected by performing the second predetermined operation (moving the shift lever 12 from the home position to the A position or B position while pressing the first button 16). It is thereby unnecessary to provide a position (moving gate) dedicated to N range. As a result, in the first embodiment, it is possible to make the movement range of the range selection mechanism (shift lever 12) small, and also reduce the manufacturing cost with a simple structure for detecting the position of the range section mechanism (shift lever 12).

Further, in the first embodiment, by making the first predetermined operation be pressing operation of the first button 16, transition to the second predetermined operation can be performed with a feeling similar to a feeling of operating a shift lever in a state that a shift lock release button, which is generally used for a vehicle, is operated, and an advantage is obtained that the operator can perform operation without a feeling of strangeness.

Still further, in the first embodiment, by making the second predetermined operation be operation to move the shift lever 12 from the home position to another position (A position or B position), it is unnecessary to provide, for example, a mechanism having a push button or the like, and another range other than N range can be selected with a minimum operation range (movement range) of the shift lever 12.

In the first embodiment, arrangement is made such that, even in case that the second predetermined operation is performed to move the shift lever 12 from the home position to the upper A position or the lower B position; the shift lever 12 automatically returns to the home position; and thereafter the first predetermined operation to press the first button 16 is performed, if the first predetermined operation is performed in a predetermined time, the time having been in a timer circuit, not shown, after the automatic return of the shift lever 12, then range selection of N range is determined invalid. This point is also common to the later described first to sixth modified examples of the first embodiment.

According to this, even if the first predetermined operation (pressing operation of the first button 16) is performed in a predetermined time after the shift lever 12 returns to the home position following the second predetermined operation, the predetermined time being set in advance in a timer circuit, not shown, as range selection of N range is determined invalid, it is thereby possible to prevent erroneous operation after the second predetermined operation is performed.

The first to sixth modified examples of the first embodiment will be described below, based on FIGS. 4 to 9. In the modified examples and other embodiments described below, the same reference symbol will be assigned to each of the same elements as those in the first embodiment, and detailed description of it will be omitted, wherein only structures and operation advantages that are different from those in the first embodiment will be described.

First Embodiment

First Modified Example

Figure 4:
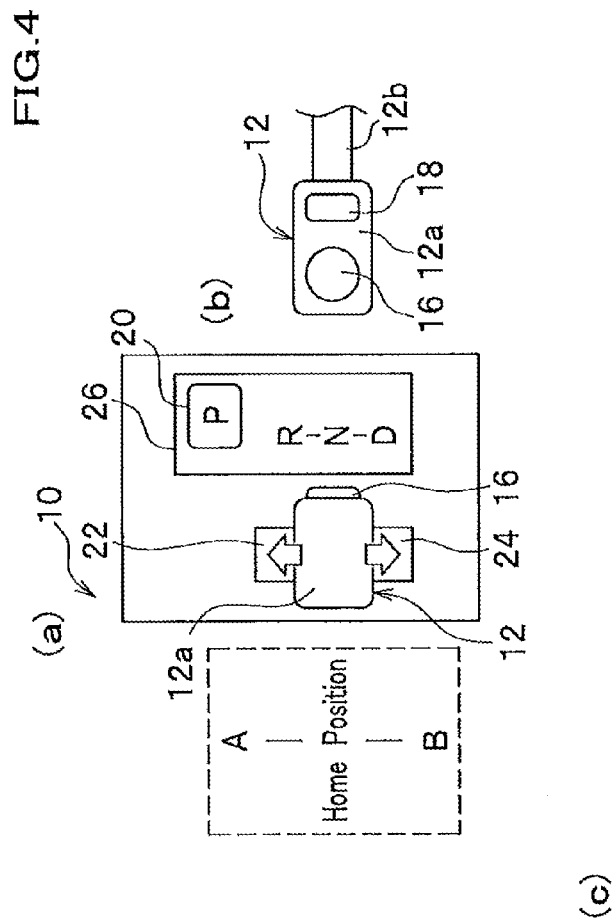
FIG. 4(a) is a plan view of a shift device according to a first modified example in the first embodiment of the invention.
FIG. 4(b) is a partial side view of a shift lever of the shift device.
FIG. 4(c) is an illustration showing shift patterns of range shifting by operation of the shift device.

The first modified example, shown in FIG. 4, is different from the first embodiment in that the shift lever 12 is arranged movably without being held in a locked state in the respective ranges, and range shifting is determined invalid even when the shift lever 12 has moved by erroneous operation. Accordingly, the first button 16 does not have a function to release a locked state in the first modified example. In other words, the shift lever 12 is arranged to be movable from the home position to the A position or B position even without pressing the first button 16, however, on the other hand, even if the shift lever 12 has moved by erroneous operation or the like, the range shifting operation is determined invalid.

That is, the controller 2 determines range shifting by movement of the shift lever 12 valid only when an ON signal has been received from the first button 16, and determines range shifting by movement of the shift lever 12 invalid if an ON signal has not been received from the first button 16 and an OFF signal is maintained. Accordingly, in the first modified example, a lock release mechanism for releasing a locked state of the shift lever 12 is unnecessary, which enables further reducing the manufacturing cost.

First Embodiment

Second Modified Example

Figure 5:
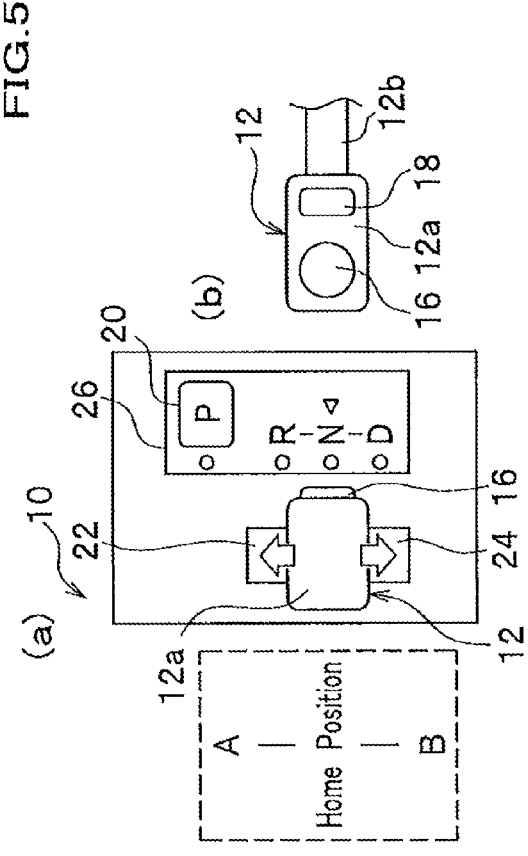
FIG. 5(a) is a plan view of a shift device according to a second modified example in the first embodiment of the invention.
FIG. 5(b) is a partial side view of a shift lever of the shift device.
FIG. 5(c) is an illustration showing shift patterns of range shifting by operation of the shift device.

The second modified example shown in FIG. 5 is different from the first embodiment in that, by pressing the second button 18, a normal automatic driving mode is switched to a manual driving mode (Man), or the manual driving mode (Man) is switched to the automatic driving mode. This manual driving mode (Man) is arranged such that each time the shift lever 12 is operated to move from the home position to the upper A position, the gear stage of AT1 is increased (Up) by one stage, and each time the shift lever 12 is operated to move from the home position to the lower B position, the gear stage decreases (Down) by one stage.

For example, when the 'current shift stage' is D range, the mode is switched from the normal automatic driving mode to the manual driving mode (Man) if the second button 18 is pressed by the operator, and further the gear stage of AT1 increases by one stage (1 Up) if the shift lever 12 is moved from the home position to the upper A position along the first path 22 by 'operation', or the gear stage decreases by one stage (1 Down) if the shift lever 12 is moved from the home position to the lower B position along the second path 24 by 'operation'.

When the 'current shift stage' is in the manual driving mode (Man), the manual drive mode (Man) is switched to the normal automatic mode if the second button 18 is pressed by the operator, however, in this situation, the range switching is determined invalid even if the shift lever 12 is moved from the home position to the A position to B position without that the first button 16 is pressed.

In the second modified example, changing of gear stage in the manual driving mode (Man) is performed by movement of the shift lever 12, however, for example, arrangement may be made such that the stage of the gear stage is increased or decreased one stage by one stage by a shift switch, not shown, provided at the steering wheel.

Further, in the second modified example, as the normal automatic driving mode can be switched to the manual mode by performing the second predetermined operation (pressing operation of the second button 18) in a state that D range is selected as the 'current shift stage', it is unnecessary to provide a device dedicated to selecting the manual driving mode. As a result, in the second modified example, it is possible to add a mechanism for selecting the manual driving mode without making the size of the shift device 10 large.

First Embodiment

Third Modified Example

Figure 6:
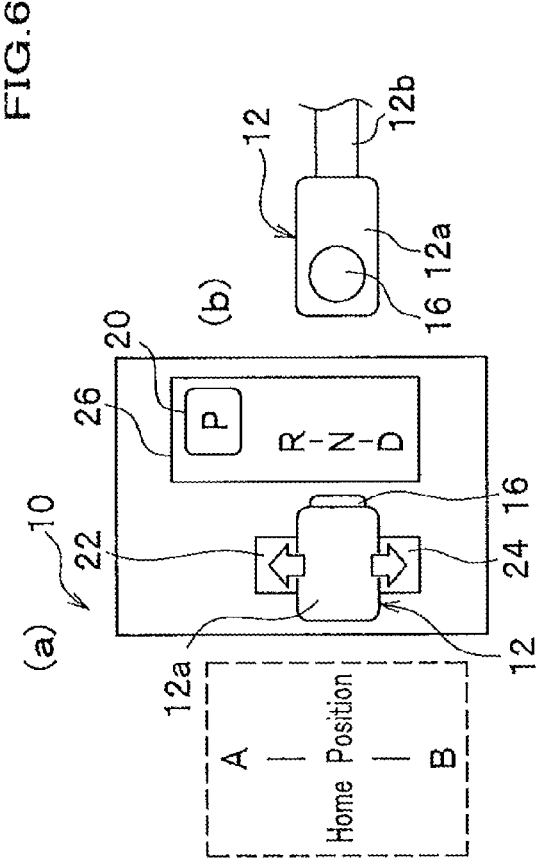
FIG. 6(a) is a plan view of a shift device according to a third modified example in the first embodiment of the invention.
FIG. 6(b) is a partial side view of a shift lever of the shift device.
FIG. 6(c) is an illustration showing shift patterns of range shifting by operation of the shift device.

The third modified example shown in FIG. 6 is different from the first embodiment and the first and second modified examples of the first embodiment in that arrangement is made in the third modified example such that the normal automatic driving mode is switched to the manual driving mode if the shift lever 12 is operated to move from the home position to A position or B position without that the first button 16 is pressed when the 'current shift stage' is in D range in the automatic driving mode.

In this situation, operation to increase the gear stage of AT1 by one stage is performed by moving the shift lever 12 from the home position to the upper A position, and the operation to decrease the gear stage of AT1 by one stage is performed by moving the shift lever 12 from the home position to the lower B position. Further, different from the case of the first embodiment and the first and second modified examples of the first embodiment, the second button 18 is unnecessary in the third modified example, which enables simplifying the device structure.

Further, in the third modified example, the first button 16 has a function to release the manual driving mode, and by pressing the first button 16 when the 'current shift stage' is in the manual driving mode, N range in the normal automatic driving mode is selected, and further, by moving the shift lever 12 from the home position to the upper A position or the lower B position while pressing the first button 16, range shifting from N range to R range or D range can be performed.

First Embodiment

Fourth Modified Example

Figure 7:
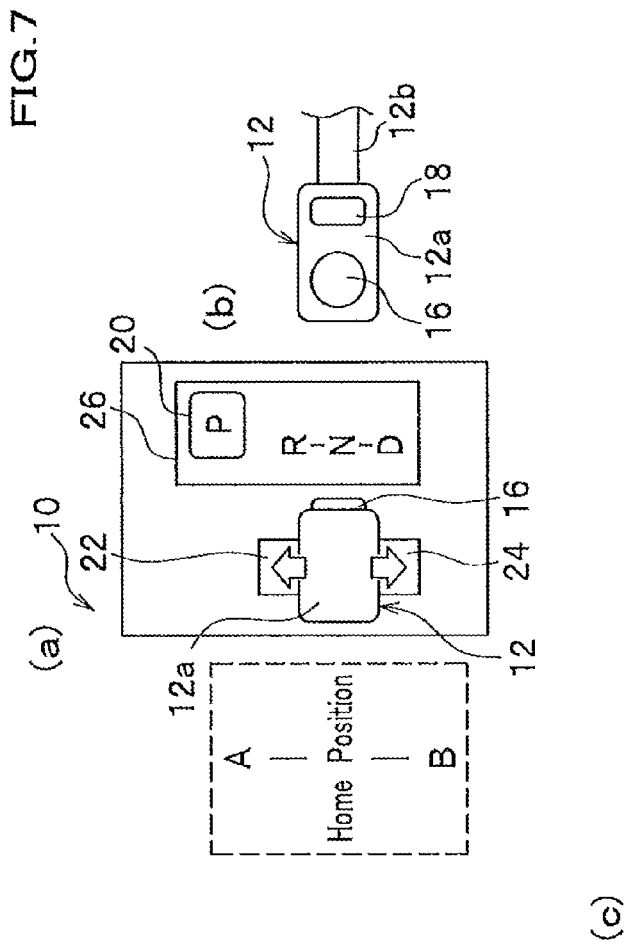
FIG. 7(a) is a plan view of a shift device according to a fourth modified example in the first embodiment of the invention.
FIG. 7(b) is a partial side view of a shift lever of the shift device.
FIG. 7(c) is an illustration showing shift patterns of range shifting by operation of the shift device.

The fourth modified example shown in FIG. 7 is different from the first embodiment in that, by moving the shift lever 12 from the home position to the lower B position when the 'current shift stage' is in R range without pressing the first button 16, range shifting from R range to N range (R→N) is performed, and that, by moving the shift lever 12 from the home position to the upper A position when the 'current shift stage' is in D range without pressing the first button 16, range shifting from D range to N range (D→N) is performed.

Further, when the 'current shift stage' has been shifted to N range in such a manner, range shifting to D range is performed by moving the shift lever 12 from the home position to B position (N→D).

In other words, in the fourth embodiment, in case it is intended to shift the 'current shift stage' to D range when the 'current shift stage' is in R range, the 'current shift stage' can be easily shifted from R range to D range by performing twice moving operation (shift operation) of the shift lever 12 from the home position to the B position side. In reverse, in case it is intended to shift the 'current shift stage' to R range when the 'current shift stage' is in D range, similarly to the shift lever operation of a conventional automatic transmission, it is necessary to press the first button 16 to shift the range from N range to R range, wherein range shifting from N range to R range without pressing the first button 16 is determined invalid in the fourth modified example.

First Embodiment

Fifth Modified Example

Figure 8:
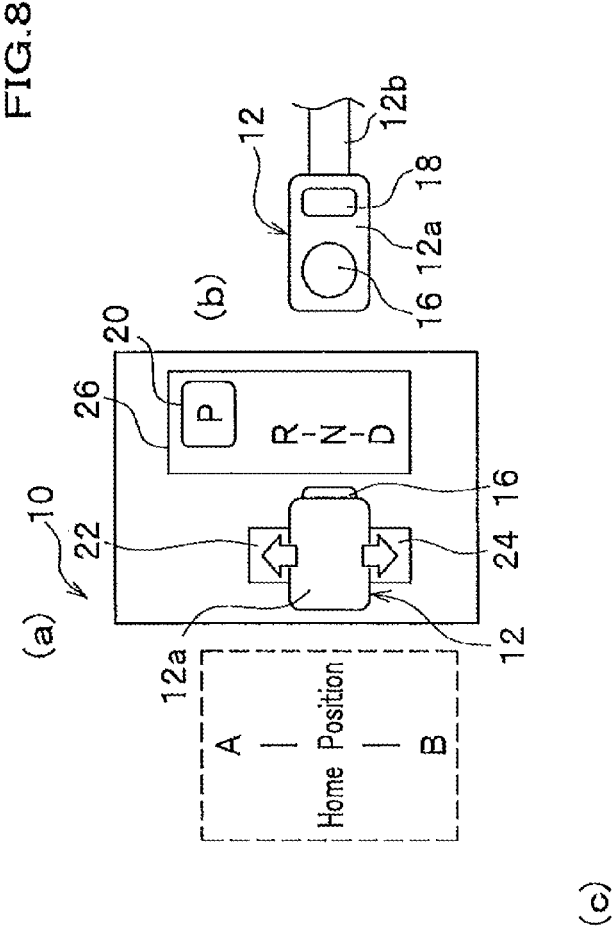
FIG. 8(a) is a plan view of a shift device according to a fifth modified example in the first embodiment of the invention.
FIG. 8(b) is a partial side view of a shift lever of the shift device.
FIG. 8(c) is an illustration showing shift patterns of range shifting by operation of the shift device.

The fifth modified example shown in FIG. 8 is different in that the function to select L range and the function to release L range by pressing the second button 18 in the fourth modified example are replaced by a function to select the manual driving mode and a function to release the manual driving mode. The other functions in the fifth modified example are the same as those in the fourth modified example.

First Embodiment

Sixth Modified Example

Figure 9:
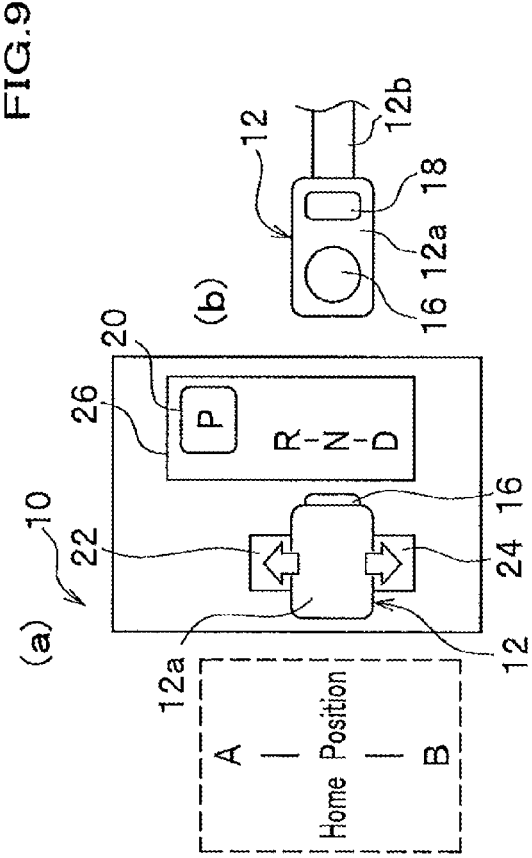
FIG. 9(a) is a plan view of a shift device according to a sixth modified example in the first embodiment of the invention.
FIG. 9(b) is a partial side view of a shift lever of the shift device.
FIG. 9(c) is an illustration showing shift patterns of range shifting by operation of the shift device.

The sixth modified example shown in FIG. 9 is different in that the second button 18 provided in the fifth modified example is unnecessary, and in case that the shift lever 12 is moved from the home position to the lower B position when the 'current shift stage' is in D range without pressing the first button 16, the normal automatic driving mode is switched to the manual driving mode. Incidentally, when the shift lever 12 is moved from the home position to the upper A position when the 'current shift stage' is in D range without pressing the first button 16, range shifting from D range to N range is performed similarly to the case of the fifth modified example.

In the sixth modified example, as the second button 18 is unnecessary, it is possible to further reduce the manufacturing cost by simplifying the structure.

Second Embodiment

Figure 10:
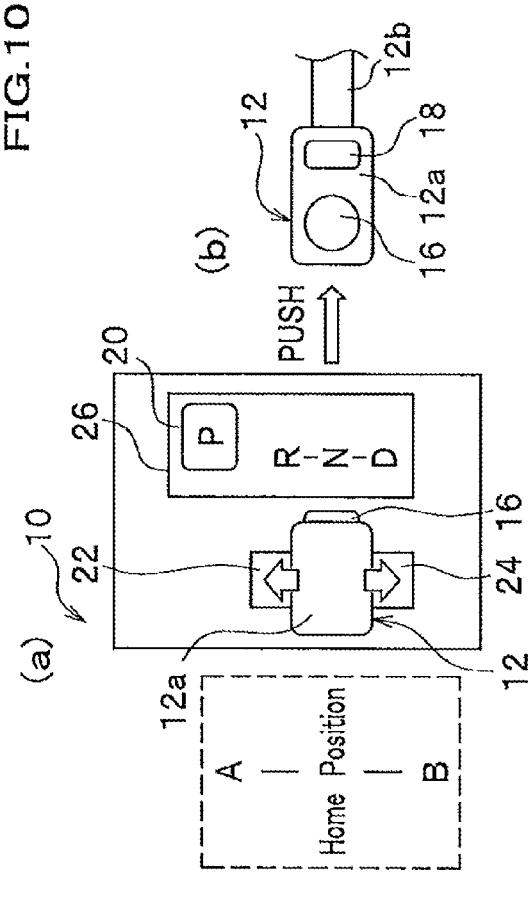
FIG. 10(a) is a plan view of a shift device according to a second embodiment of the invention.
FIG. 10(b) is a partial side view of a shift lever of the shift device.
FIG. 10(c) is an illustration showing shift patterns of range shifting by operation of the shift device.

FIG. 10 is an illustration showing a shift device and the shift patterns of the shift device according to a second embodiment. In FIG. 10(c), 'Request' refers to as an operation, desired by the operator, to be performed from the state of range in the current shift stage. 'Maintain' refers to as a state that, when the 'current shift stage' is at any one of the range positions 'P/R/N/D', the shift position at the home position (H) is held in the individual range (P→P range, R→R range, N→N range, D→D range) in the 'current shift stage' by a shift lock mechanism not shown. Further, 'BRK' in the horizontal row 'SHIFT LOCK' means that it becomes possible to an operate (pushing operation along the axial direction) the shift lever 12 when the locked state of the shift lever 12 is released by the operator's depressing a brake pedal, not shown.

Still further, 'PUSH' means an operation to push the shift lever 12 along the axial direction by the operator, and 'PUSH+R' or 'PUSH+D' refers to moving, by the operator, of the shift lever 12 from the home position to the upper A position (R) or the lower B position (D) along the axial direction while pushing the shift lever 12 along the axial direction.

Incidentally, the second embodiment is the same as the first embodiment in that the shift positions of the shift lever 12 are arranged at three positions with a predetermined distance therebetween substantially on a line, that are a home position disposed at the center, A position disposed upper than the home position, and B position (still another position) disposed lower than the home position. Further, the second embodiment is also the same as the first embodiment in that, the shift lever 12 is held in a locked state by a shift lock mechanism, for example, a solenoid not shown, in the respective ranges, namely P range, R range, N range, D range, and L range.

In the second embodiment, a function is provided to release the locked state of the shift lever 12 by pushing the shift lever 12 along the axial direction and to select N range as the shift range in a state that, first, the locked state of the shift lever 12 is released by depressing the brake pedal not shown and the shift lever 12 has become operable in place of the first button 16 in the first embodiment. Pressing by the operator of the shift lever 12 along the axial direction may be performed such that only the shift knob 12a is displaced along the axial direction, or the whole shift lever 12 with the shift knob 12a and the shift rod 12b is displaced along the axial direction. In the second embodiment, arrangement is made such that the shift lever 12 is displaced along the axial direction, however, without being limited thereto, for example, in a case that a dial system is selected as a range selection mechanism, it is needless to say that an operation to push a dial, not shown, along the axial direction and rotate the dial in the circumferential direction by a predetermined angle is also covered by the invention.

In the second embodiment, for example, in case that the 'current shift stage' is in P range and the operator intends to shift the range from P range to D range, the locked state of the shift lever 12 can be released into an operable state by the operator's depressing of the brake pedal, not shown, and the range position can be shifted to D range by the operator's moving the shift lever 12 to the lower B position while pushing the shift lever 12 along the axial direction.

In the second embodiment, the locked state of the shift lever 12 can be surely released in a stopped state of the vehicle, by continuously performing operation in two steps wherein the first step is to depress the brake pedal, not shown, to release the locked state of the shift lever 12 and thereby make the shift lever 12 operable, and the second step is to push the shift lever 12 along the axial direction to release the locked state of the shift lever 12. On the other hand, in case that the 'current shift stage' is in R range or D range and the operator shifts the range from R range or D range to N range (R→N, D→N), and in case that the 'current shift stage' is in D range or L range and the operator shifts the range from D range to L range or from L range to D range (D→L, L→D), the depressing operation of the brake, not shown, by the operator is unnecessary ('BRK' unnecessary).

Further, in the second embodiment, the first predetermined operation is to push the shift lever 12 along the axial direction, and the second predetermined operation is to move the shift lever 12 from the home position to A position or B position while pressing the shift lever 12.

Still further, in the second embodiment, by making the first predetermined operation be an operation to push the shift lever 12 along the axial direction, it is unnecessary to provide a mechanism, for example, a push button and the like, and it is thus possible to attain downsizing of the shift knob 12a that the operator grips, the shift knob 12a being a portion of the shift lever 12.

Third Embodiment

Figure 11:
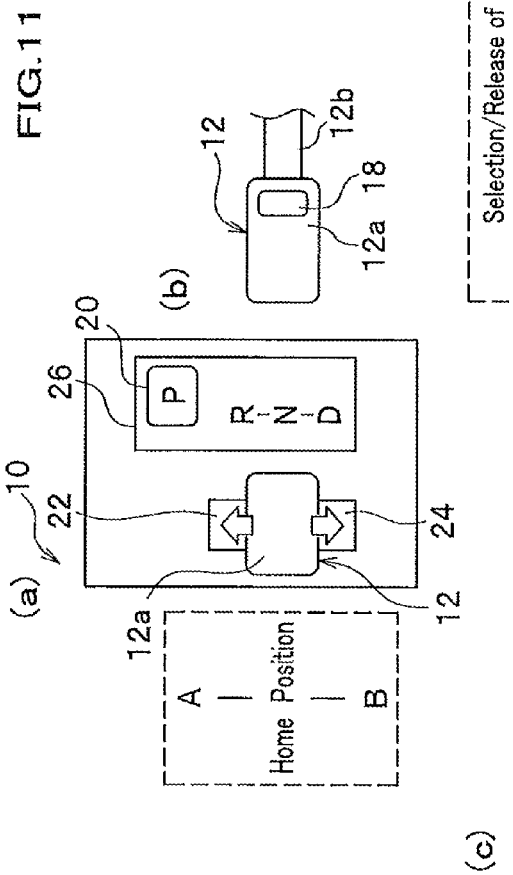
FIG. 11(a) is a plan view of a shift device according to a third embodiment of the invention.
FIG. 11(b) is a partial side view of a shift lever of the shift device.
FIG. 11(c) is an illustration showing shift patterns of range shifting by operation of the shift device.

A third embodiment shown in FIG. 11 is different from the first embodiment in that a shift lock mechanism for locking the first button 16 and the shift lever 12 at respective positions is made unnecessary to attain a further simpler structure. Further, the third embodiment is different from the first embodiment in that, in case the 'current shift stage' is in P range, the range is shifted to N range by moving the shift lever 12 from the home position to A position or B position, in case that the 'current shift stage' is in R range, the range is shifted to N range by moving the shift lever 12 from the home position to the lower B position, or in case that the 'current shift stage' is in D range, the range is shifted to N range by moving the shift lever 12 from the home position to the upper A position.

That is, the third embodiment is different from the first embodiment in that, in a state that the shift lever 12 is at the home position, N range is selected by the first predetermined operation to move the shift lever 12 from the home position to A position or B position. In this case, whether the first predetermined operation moves from the home position to A position or B position depends on a predetermined range that is set in advance in the 'current shift stage'.

Further, in the third embodiment, by making the first predetermined operation be an operation to move the shift lever 12 from the home position to A position or B position, it is unnecessary to provide a mechanism, for example, a push button and the like, and it is thus possible to attain downsizing of the shift knob 12a of the shift lever 12, the shift knob 12a being a portion that the operator grips.

As described above, for example, although, when the 'current shift stage' is in P range, the range is shifted to N range regardless of to which of A position and B position the shift lever 12 is moved from the home position; for example, when the 'current shift stage' is in R range, the range is shifted to N range only when the shift lever 12 is moved from the home position to the lower B position corresponding to the upper/lower position (upper/lower order) indicated by an English character (If the shift lever 12 is moved to the upper A position, range shifting is determined invalid.); and further, for example, when the 'current shift stage' is D range, the range is shifted to N range only when the shift lever 12 is moved to the upper A position corresponding to the upper/lower position (upper/lower order) indicated by an English character (If the shift lever 12 is moved to the lower B position, range shifting is determined invalid.)

Subsequently, in the third embodiment, after the range position is shifted to N range, the range is shifted from N range to R range (N→R) by moving the shift lever 12 from the home position to the upper A position without pressing any button (because the shift lever 12 is not in the locked state), and on the other hand, the range position is shifted from N range to D range by moving the shift lever 12 from the home position to the lower B position (N→D).

In this case, the third embodiment is different from the first embodiment in that the second predetermined operation merely moves the shift lever 12 from the home position to A position or B position without pressing a button.

In the third embodiment, for example, when the 'current shift stage' is in P range, the range position is shifted from P range to R range by moving the shift lever 12 continuously twice from the home position to the upper A position, and on the other hand, the range position is shifted from P range to D range by moving the shift lever 12 continuously twice from the home position to the lower B position. Incidentally, when the 'current shift stage' is in P range, the range position can also be shifted from P range to R range by moving the shift lever 12 once from the home position toward the lower B position and then, after the return of the shift lever 12 to the home position, moving the shift lever 12 once from the home position toward the A position.

Further, in the third embodiment, for example, when the 'current shift stage' is in D range, the range position is shifted from D range to R range by moving the shift lever 12 continuously twice from the home position to the upper A position. Still further, for example, when the 'current shift stage' is in R range, the range position is shifted from R range to D range by moving the shift lever 12 continuously twice from the home position to the lower B position.

In such a manner, in the third embodiment, a desired range position can be easily selected by moving the shift lever 12 from the home position to A position or B position once or twice. The second button 18 may have either a function to select and release L range or a function to switch to the manual driving mode. As this point is the same as in the first and second modified examples of the first embodiment, detailed description on this point will be omitted.

Modified examples of the third embodiment will be described below in detail, based on FIGS. 12 to 15.

Third Embodiment

First Modified Example

Figure 12:
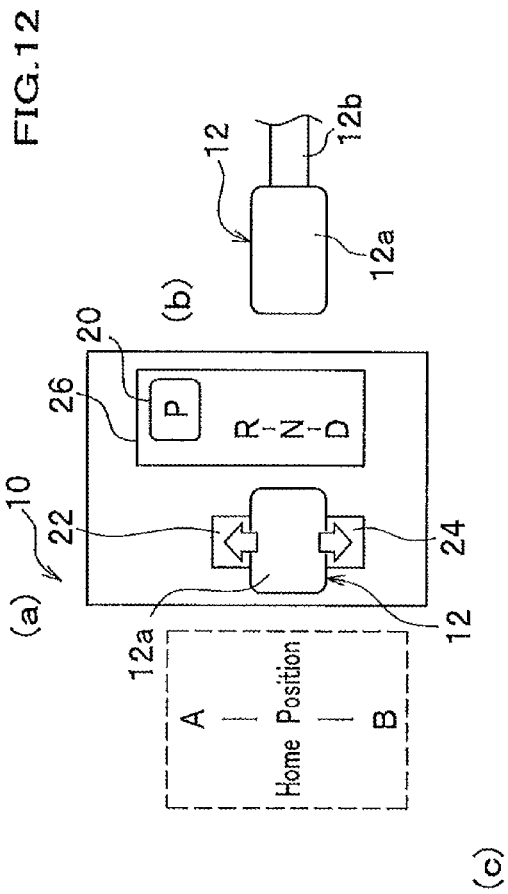
FIG. 12(a) is a plan view of a shift device according to a first modified example in the third embodiment of the invention.
FIG. 12(b) is a partial side view of a shift lever of the shift device.
FIG. 12(c) is an illustration showing shift patterns of range shifting by operation of the shift device.

In comparison with the third embodiment, a first modified example shown in FIG. 12 has a feature in that the second button 18 is made unnecessary, and when the 'current shift stage' is in D range, L range can be selected by operating the shift lever 12.

That is, in the first modified example, when the 'current shift stage' is in D range, the range position is shifted from D range to L range by moving the shift lever 12 from the home position to the lower B position. In comparison with the third embodiment, the first modified example has advantages of making it possible to simplify the structure because of the unnecessity of the second button 18 and to select L range by just operating the shift lever 12 without pressing the second button 18.

Further, in the first modified example, for example when the 'current shift stage' is in L range, the range position can be shifted from L range to R range (L→D→N→R) by moving the shift lever 12 continuously three times from the home position to the upper A position. In this case, the range position is shifted from L range to D range by the first moving from the home position to A position (L→D); likewise shifted from D range to N range by the second moving from the home position to A position (D→N); and likewise shifted from N range to R range by the third moving from the home position to A position (N→R). Incidentally, the first modified example does not include the function to switch to the manual driving mode, this function being provided in the third embodiment.

In the first modified example, for example, in case of shifting the range position to R range when the 'current shift stage' is in L range, a substantially single operation to move shift lever 12 continuously twice from the home position to the upper A position is the first predetermined operation. Other points are the same as in the third embodiment, and accordingly description in detail will be omitted.

In the first modified example, in a state that a driving range (D range, L range, or R range) has been selected by the shift lever 12 and the shift lever 12 is at the home position, by performing a fourth predetermined operation of the shift lever 12 (moving operation to move the shift lever 12 from the home position to the upper A position or the lower B position), selected is N range or a driving range (L range) that is in the same direction as the driving direction of the current driving range having been selected and is different in the gear stage from the current driving range having been selected. As a result, in the first modified example, it is possible to easily shift the range from the current driving range to a driving range in the same direction as the current driving range and with a gear stage different from the gear stage of the current driving range having been selected, and also this shifting to the driving range in the same direction as the current driving range and with the gear stage different from the gear stage of the current driving range can be attained without a special device for this shifting.

Third Embodiment

Second Modified Example

Figure 13:
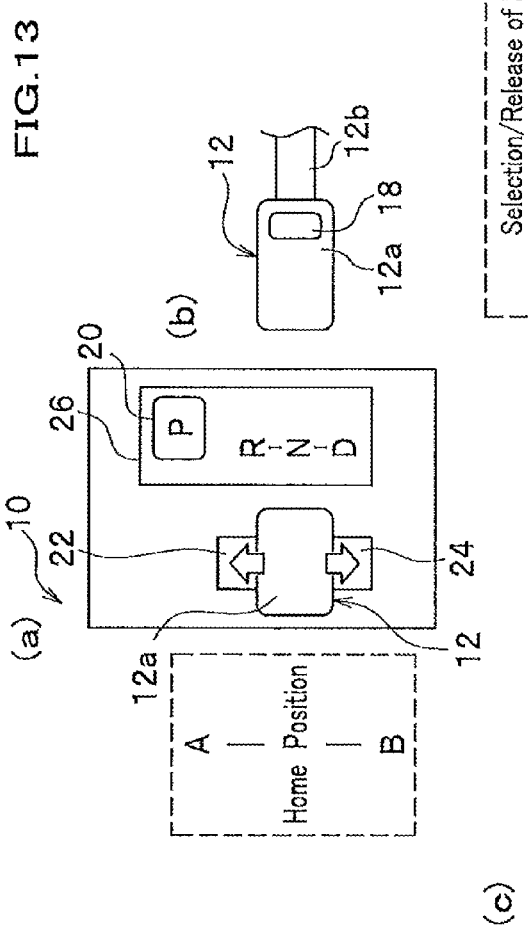
FIG. 13(a) is a plan view of a shift device according to a second modified example in the third embodiment of the invention.
FIG. 13(b) is a partial side view of a shift lever of the shift device.
FIG. 13(c) is an illustration showing shift patterns of range shifting by operation of the shift device.

In comparison with the third embodiment, the second modified example shown in FIG. 13 has a feature that, in case that the 'current shift stage' is in P range, R range or D range can be directly selected not through N range.

That is, in the second modified example, in case that the 'current shift stage' is in P range, it is possible to shift the range position from P range to R range by moving the shift lever 12 once from the home position to A position corresponding to the upper/lower position (upper/lower order) indicated by an English character, and it is also possible to shift the range position from P range to D range by moving the shift lever 12 once from the home position to the lower B position.

In other words, in the second modified example, in a state of the current stage for which a non-driving range (P range, N range) is selected by the shift lever 12 that functions as a range selection mechanism, by moving the shift lever 12 just once from the home position to the upper A position or the lower B position as the third predetermined operation, a range (D range, R range) other than N range can be selected without that N range is selected.

In this regard, while, in the third embodiment, in case that the 'current stage' is in P range, the range position was shifted to R range or D range by moving the shift lever 12 continuously twice from the home position to the upper A position or the lower B position, in the second modified example, P range can be shifted to R range or D range by moving the shift lever 12 just once from the home position to A position or B position, with an advantage that range shifting operation thus can be made speedy and simple.

In the second modified example, in case of shifting the range position to N range when the 'current shift stage' is in P range, the range position can be shifted from P range to N range (P→N) by firstly moving the shift lever 12 once from the home position to the lower B position (P→D), and secondly moving the shift lever 12 continuously once from the home position to the upper A position (D→N). Likewise, in the second modified example, in case of shifting the range position to N range when the 'current shift stage' is in P range, the range position can be shifted from P range to N range (P→N) by firstly moving the shift lever 12 once from the home position to the upper A position (P→R), and secondly moving the shift lever 12 continuously once from the home position to the lower B position (R→N).

In the second modified example, in a state that a non-driving range (P range) has been selected by the shift lever 12 and the shift lever 12 is at the home position, a range (R range or D range) other than N range can be easily selected by performing the third predetermined operation of the shift lever 12 (operation to move the shift lever 12 from the home position to the upper A position or the lower B position) without N range being selected. As a result, in the second modified example, it is unnecessary to provide a special device for shifting the range position from a non-driving range (N range or P range) to a range (R range or D range) other than N range not through N range, and downsizing and weight reducing of the device can be thus attained.

Further, in the second modified example, in case that P range is selected, as it is possible to easily select another range, which is R range or D range, by just moving the shift lever 12 to another position without selecting N range, the operability can be improved, for example, the operability at a start of driving from a parking state.

Third Embodiment

Third modified Example

Figure 14:
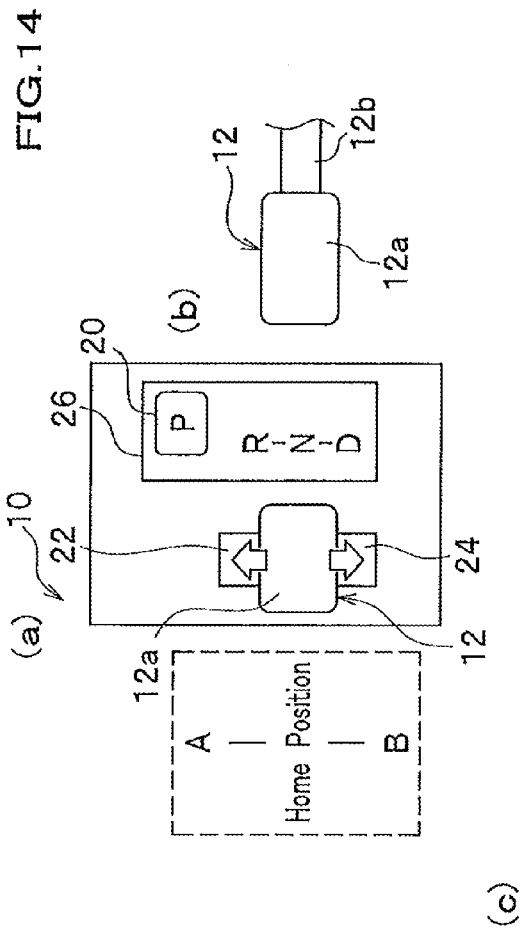
FIG. 14(a) is a plan view of a shift device according to a third modified example in the third embodiment of the invention.
FIG. 14(b) is a partial side view of a shift lever of the shift device.
FIG. 14(c) is an illustration showing shift patterns of range shifting by operation of the shift device.

The third modified example shown in FIG. 14 has a feature that the first modified example and the second modified example are combined, and detailed description will be omitted.

Third Embodiment

Fourth Modified Example

A fourth modified example shown in FIG. 15 has a feature that, in case it is intended to shift the range to D range or R range when the 'current shift stage' is in R range or D range, the range is shifted to R range or D range by shifting the range to N range by a first operation to move the shift lever 12 from the home position to A position or B position, and thereafter holding the shift lever 12 for a predetermined time at A position or B position to which the shift lever 12 has moved. The predetermined time for holding the shift lever 12 at the position to which the shift lever 12 has been moved can be set, as appropriate, by a timer circuit, not shown, electrically connected with the controller 2.

That is, in the fourth modified example, in case that it is intended to shift the range position to D range when the 'current shift stage' is in R range, the range position can be directly shifted from R range to D range (R→D), by firstly moving the shift lever 12 once from the home position to the lower B position (R→N), and thereafter secondly holding for the predetermined time the shift lever 12 at B position to which the shift lever 12 has been further continuously moved (N→D).

Likewise, in the fourth modified example, in case that it is intended to shift the range position to R range when the 'current shift stage' is in D range, the range position can be directly shifted from D range to R range (D→R) by firstly moving the shift lever 12 once from the home position to the upper A position (D→N), and thereafter secondly holding for the predetermined time the shift lever 12 at A position to which the shift lever 12 has been further continuously moved (N→R).

In such a manner, in the fourth modified example, in case of shifting the range position mutually between R range and D range, the first predetermined operation to move the shift lever 12 from the home position to A position or B position and the second predetermined operation to hold the movement state of the shift lever 12 for a predetermined time are arranged as a substantially single operation in which the first and second predetermined operations are closely related to each other and cannot be separated from each other, and this arrangement enables simplifying the operation of the shift lever 12 and improves the operability of the shift lever 12.

The fourth modified example is the same as the first modified example in that, in case of shifting the range position to R range when the 'current shift stage' is in L range, the range position can be shifted from L range to R range by moving the shift lever 12 three times from the home position to the upper A position, similarly to the case of the first modified example.

In the fourth modified example, regardless of which range the shift lever 12 at the home position is in, N range is always selected by moving the shift lever 12 to another position (A position or B position) and a desired range other than N range can be selected by holding the shift lever 12 at the other position (A position or B position) for a predetermined time after the selection of N range. Accordingly, it is unnecessary to provide a position (movement gate) dedicated to N range.

As a result, in the fourth modified example, it is possible to make the movement range of the shift lever 12 small and reduce the manufacturing cost by simplifying the structure for detecting the position of the shift lever 12. Further, in the fourth modified example, it is possible to select a range other than N range without adding a special device.

The present invention has been described above with a plurality of embodiments and modified examples of these embodiments, however, the invention is not limited thereto. For example, in case that the 'current shift stage' is in N range, arrangement may be made such that D range is selected by just an operation to move the shift lever 12 without operating a button. In such a manner, similarly to the operation of an automatic transmission of conventional art, it is possible to shift the range position from N range to D range. Further, it is appropriate to make arrangement such that N range is selected by either a button operation or an operation to move the shift lever 12 when the 'current shift stage' is in D range or R range.

Further, it is appropriate to make arrangement such that, when a range shifting operation by moving the shift lever 12 is reflected in the vehicle, the reflection is notified to the operator, for example, by a sound generated by a sound generation unit, not shown. In reverse, it is appropriate to make arrangement such that, when a range shifting operation by moving the shift lever 12 is not reflected to the vehicle, the non-reflection is notified to the operator, for example, by an alarm or indication on the indicator of the instrument panel 14. Incidentally, it is appropriate to use a different method of outputting sound or indication only in a case that R range has been selected as a requested and desired range, compared with a method used in a case that a range other than R range has been selected.

REFERENCE SYMBOLS

1 . . . automatic transmission (AT, transmission)
2 . . . controller
10 . . . shift device
12 . . . shift lever (range selection mechanism)
16, 18, 20 . . . first to third buttons (buttons)

The invention claimed is:
1. A shift device, comprising:
a range selection mechanism for selecting an N range and one or more ranges other than the N range of a transmission, the range selection mechanism comprising a lever and an input unit installed on the lever, the input unit receiving an operation by a driver;
a home position to which the range selection mechanism automatically returns after an operation of the lever of the range selection mechanism; and
other positions to which the range selection mechanism is moved in respective predetermined directions from the home position,
wherein the lever is lockable and released from locking in response to operation of the input unit;
wherein the range selection mechanism detects operation of the input unit and determines a state of the transmission and a lock state of the lever based on the operation of the input unit;
wherein, for the transmission, in a state that at least one range has been selected from the one or more ranges other than the N range and the range selection mechanism is at the home position, the N range is always selected by performing a first predetermined operation of the input unit of the range selection mechanism, and wherein, for the transmission, in a state that the N range has been selected and the range selection mechanism is at the home position, a range other than the N range is selected from the one or more ranges other than the N range by performing a second predetermined operation of the range selection mechanism while continuing the first predetermined operation of the input unit of the range selection mechanism.

2. The shift device according to claim 1, wherein the first predetermined operation is to operate a button.

3. The shift device according to claim 1, wherein the first predetermined operation is to push the range selection mechanism along an axial direction.

4. The shift device according to claim 1,
wherein one of the one or more ranges other than the N range is D range,
and wherein when the second predetermined operation is performed in a state that the D range has been selected, the transmission turns into a manual mode in which a gear stage of the transmission changes by one stage each time the second predetermined operations is performed.

5. The shift device according to claim 1, wherein, for the transmission, even in case that the second predetermined operation is performed, the range selection mechanism automatically returns to the home position, and thereafter the first predetermined operation is performed, if the first predetermined operation is performed within a predetermined time after the automatic return of the range selection mechanism, the range selection of the N range is determined invalid.

\* \* \* \* \*